(12) United States Patent
Wu et al.

(10) Patent No.: US 11,741,768 B2
(45) Date of Patent: Aug. 29, 2023

(54) INTELLIGENT PREVENTION PASSAGE CONTROL SYSTEM FOR ELECTRONIC DEVICE

(71) Applicants: State Nuclear Security Technology Center, Beijing (CN); Reach (Beijing) Technology Co., Ltd., Beijing (CN)

(72) Inventors: Zhaohui Wu, Beijing (CN); Jicai Xu, Beijing (CN); Yeliang Han, Beijing (CN); Huiling Liu, Beijing (CN); Changjie Yang, Beijing (CN); Wanqiang Wang, Beijing (CN); Fanglei Chen, Beijing (CN); Nan Jiang, Beijing (CN); Xuemei Gao, Beijing (CN); Jingqiu Sun, Beijing (CN); Chun Li, Beijing (CN); Lidan Chen, Beijing (CN); Hong Jiang, Beijing (CN); Wenzhu Tian, Beijing (CN); Jilong Zhang, Beijing (CN); Kun Zhao, Beijing (CN); Ming Yao, Beijing (CN); Qi Liu, Beijing (CN)

( * ) Notice: Subject to any disclaimer, the term of this patent is extended or adjusted under 35 U.S.C. 154(b) by 0 days.

(21) Appl. No.: 17/879,820

(22) Filed: Aug. 3, 2022

(65) Prior Publication Data
US 2023/0045481 A1 Feb. 9, 2023

(30) Foreign Application Priority Data
Aug. 5, 2021 (CN) .......................... 202110895438.0

(51) Int. Cl.
*G08B 27/00* (2006.01)
*G07C 9/25* (2020.01)
*G01S 13/88* (2006.01)

(52) U.S. Cl.
CPC ............ *G07C 9/257* (2020.01); *G01S 13/887* (2013.01); *G06V 2201/05* (2022.01)

(58) Field of Classification Search
CPC .... G06V 2201/05; G06V 20/20; G06V 20/52; G06V 40/10; G06V 40/172;
(Continued)

(56) References Cited

U.S. PATENT DOCUMENTS 11,164,415 B1 * 11/2021 Reynolds, III ............ G06T 7/73
2009/0322866 A1 * 12/2009 Stotz ...................... G07C 9/257
382/118
(Continued)

FOREIGN PATENT DOCUMENTS

| CN | 110031909 A | 7/2019 |
|----|-------------|--------|
| CN | 110390748 A | 10/2019 |

*Primary Examiner* — Dionne Pendleton

(57) ABSTRACT

The present disclosure relates to an intelligent prevention passage control system for an electronic device, which comprises a detection device for an electronic device, a traffic control device integrated with the detection device for the electronic device, an industrial control host, a server, an access controller and a management terminal inside the traffic control device. The present disclosure can more accurately judge violations by scoring violations, and can make the system more intelligent by accurately judging violations, thus realizing no manual attendance, solving the problems of personnel recruitment, shift attendance and personnel management, and saving a lot of labor cost. At the same time, the system can avoid the hidden dangers caused by human feelings, sense of responsibility and inertia brought by manual prevention, and ensure the consistent, accurate and reliable standards of detection work.

8 Claims, 3 Drawing Sheets

(58) Field of Classification Search
CPC ..... G01V 5/0008; G01S 13/887; G01S 1/725; G01S 5/0027; G01S 5/18; G01S 5/30; G08B 25/10; G08B 21/02; G08B 21/0211; G08B 21/0269; G08B 21/0272; G08B 21/0275; G08B 25/016; G08B 27/00; G08B 13/19608; G08B 13/19621; G08B 13/19656; G08B 21/0241; G08B 21/0415; G08B 25/001; G08B 29/188; H04W 4/80; H04W 4/90; H04W 4/029; H04W 64/00; G02B 27/017; G02B 2027/0127; G02B 2027/0134; G02B 2027/014; G02B 2027/0141; G10L 15/22; G10L 2015/223; G10L 15/1822; G10L 15/26; G10L 15/30; G10L 21/0208; G10L 25/78; G10L 25/84; A62B 18/08; G06F 3/005; G06F 3/017; G06F 3/1446; G06F 3/16; G06F 3/167; G06F 40/117; G06F 40/169; G06F 40/205; G06N 3/006; G06N 5/043; G06Q 30/0201; G06Q 30/0269; G06Q 30/0281; G06Q 50/01; G06T 19/006; G06T 19/20; G06T 2219/004; G07C 9/257; G07C 9/37; G07C 9/15; G07C 9/00944; G07C 9/10; G07C 9/27; G07C 9/38; H04R 1/1091; H04R 1/406; H04R 2460/07; H04R 3/005; H04B 7/14; G16H 10/60; G16H 20/10; H04N 13/204; H04N 13/332; H04N 13/344; H04N 13/398; H04N 7/183; E05G 5/003

See application file for complete search history.

(56) References Cited

U.S. PATENT DOCUMENTS

| | | | |
|---|---|---|---|
| 2017/0331827 A1* | 11/2017 | Salyers | H04L 63/10 |
| 2018/0167774 A1* | 6/2018 | Hodge | H04W 12/08 |
| 2022/0366494 A1* | 11/2022 | Cella | G06Q 30/0201 |

* cited by examiner

INTELLIGENT PREVENTION PASSAGE CONTROL SYSTEM FOR ELECTRONIC DEVICE

CROSS REFERENCE TO RELATED APPLICATION

This application claims priority benefit of Chinese Invention Application No. 202110895438.0, filed on Aug. 5, 2021, and the entire contents of which are incorporated herein by reference.

TECHNICAL FIELD

The present disclosure relates to the technical field of security inspection systems, in particular to an intelligent prevention passage control system for an electronic device.

BACKGROUND

At present, the widely used management mode is to use a detection door for contraband goods (or a detection door for metal objects)+manual security attendance, which has the following problems.

1. The detection door for contraband goods (or a detection door for metal objects) works independently, only detects and warns people who pass through, and has no integrated blocking functions, so that it is impossible to achieve the technical control of inspecting one person each time for each traffic.

2. Manual security attendance monitors and processes alarm signals, which requires high professionalism, sense of responsibility and working state of operators. The probability of missing and making mistakes is higher, and the responsibilities are not well defined accurately. At the same time, a large number of security guards are needed in the control areas with a large number of people, and the personnel cost will be very high.

3. The above-mentioned device cannot be effectively integrated with the passage access control system, cannot form a one-to-one inspection record for later tracing inquiry, and even cannot systematically screen the deliberate and tentative traffic behaviors of individual offenders for many times and automatically blacklist the offenders, so that the offenders cannot enter the control area afterwards.

SUMMARY

Therefore, the present disclosure provides an intelligent prevention passage control system for an electronic device, which is used to overcome the problem in the prior art that a detection door for contraband goods has a single structure.

In order to achieve the above purpose, the present disclosure provides an intelligent prevention passage control system for an electronic device, comprising a traffic control device, a detection device for an electronic device provided inside the traffic control device, an industrial control host, an access controller and a management terminal;

wherein the detection device for the electronic device comprises an external identity verification device installed on the right side wall of the detection device for the electronic device, a passage state indication device installed at the top of the detection device for the electronic device, an electronic device detection system and a sound warning device, and is configured to judge whether the detected person carries contraband goods;

the traffic control device is connected with the detection device for the electronic device, and comprises a traffic control system installed at the top of the traffic control device, a light-sensing lighting device, a lighting device, a video monitoring device, a contraband goods indication device installed on the right vertical face of the middle part of an outer door of the traffic control device, an access control authorization state indication device, a biometric identification device installed inside the traffic control device, and an inner door and an outer door installed at both ends of the traffic control device, and is configured to judge whether to release the detected person;

the industrial control host is provided inside the traffic control device, is connected with the detection device for the electronic device, the traffic control device, the server, the access controller and the management terminal, and is configured to control the operation of the system;

the industrial control host presets the number of times $F0$ of carrying standard contraband goods and the area $V0$ of standard contraband goods, the industrial control host compares the number of times $F$ of carrying the actual contraband goods detected by the detection device for the electronic device with the standard violation times $F0$, if $F \geq F0$, the industrial control host judges that the number of times of the contraband goods carried by the detected person exceeds the standard and the detected person, is blacklisted, if $F=F0$, the industrial control host judges that the number of times of the contraband goods carried by the detected person does not exceed the standard and the next detection is carried out; when detecting contraband goods, the industrial control host compares the area $V$ of the actual contraband goods with the area $V0$ of the standard contraband goods, and adjusts the number of times of the actual contraband goods according to the comparison result.

Further, the industrial control host presets a first contraband goods category $A1$, a second contraband goods category $A2$, a third contraband goods, category $A3$ and a fourth contraband goods category $A4$, the industrial control host selects the corresponding violation score $E$ according to the contraband goods category, and when the industrial control host sets the contraband goods category as $Ai$, $i=1,2,3,4$, and the industrial control host denotes the violation score as $Ei$.

Further, the industrial control host also presets the standard authority level $B0$ of the detected person, and when the contraband goods is, detected, the industrial control host corrects the violation score according to the actual authority level $B$ of the detected person;

when $B<B0$, the industrial control host corrects the violation score $E$ and denotes, the corrected standard violation times as $Ea$, and $Ea=E \times (B-B0/B+B0)$ is set;

when $B=B0$, the industrial control host does not correct the violation score $E$;

when $B>B0$, the industrial control host corrects the violation score $E$ and denotes the corrected standard violation times as $Eb$, and $Eb=E \times (1+(B-B0/B+B0))$ is set.

Further, when the industrial control host judges that the detected person carries contraband goods, the industrial control host calculates the area $V$ of the actual contraband goods according to the human body plan information generated by the electronic device detection system, and after the calculation, the industrial control host compares the area $V$ of the actual contraband goods with the area $V0$ of the standard contraband goods and makes secondary correction to the violation score according to the comparison result;

when V≥V0, the industrial control host judges that the detected person accidentally carries contraband goods and does not correct the actual violation times;

when V<V0, the industrial control host judges that the detected person intentionally carries contraband goods and makes secondary correction to the violation score.

Further, when the industrial control host makes secondary correction to the violation score, the industrial control host calculates the secondary violation score correction adjustment coefficient $\alpha$, and $\alpha=V0/V$ is set;

when B<B0, the industrial control host denotes the violation score after secondary correction as Ea', and Ea'=Ea×$\alpha$ is set;

when B=B0, the industrial control host denotes the violation score after secondary correction as and E', E'=E×$\alpha$ is set;

when B>B0, the industrial control host denotes the violation score after secondary correction as Eb', and Eb'=Eb×$\alpha$ is set.

Further, when contraband goods is detected, the industrial control host compares the violation score E with the standard violation score E0;

when E≥E0, the industrial control host denotes the violation as the number of times of carrying contraband goods;

when E<E0, the industrial control host does not denote the violation as the number of times of carrying contraband goods.

Further, when scoring violations, the industrial control host judges whether the detected person intentionally carries contraband goods according to the position image of the actual contraband goods, if the contraband goods is concealed, the industrial control host denotes the violation as the number of times of carrying contraband goods, and if the contraband is not concealed, the industrial control host scores the violation.

Further, when contraband goods is detected, the industrial control host corrects the standard violation times F0 according to the actual authority level B of the detected person;

when B≤B0, the industrial control host does not correct the standard violation times F0;

when B>B0, the industrial control host corrects the standard violation times F0 and denotes the corrected standard violation times as F0', and F0'=F×((B−B0/B+B0) is set, wherein when F0' is not an integer, it is rounded down.

Further, the industrial control host also presets the standard authority level of the detected person. The violation score can be accurately judged according to the situation of different detected people, and the violations can be more accurately judged. The system can be more intelligent by accurately judging violations, thus realizing no manual attendance, solving the problems of personnel recruitment, shift attendance and personnel management, and saving a lot of labor cost. At the same time, the system can avoid the bidden dangers caused by human feelings, sense of responsibility and in brought by manual prevention, and ensure the consistent, accurate and reliable standards of detection work.

Further, the industrial control host calculates the area of the actual contraband goods according to the human body plan information generated by the electronic device detection system. The violation score can be accurately judged by judging the size of contraband goods. The violations can be more accurately judged. The system can be more intelligent by accurately judging violations, effectively avoiding the violation caused by negligence or other reasons of the detected person, thus realizing no manual attendance, solving the problems of personnel recruitment, shift attendance and personnel management, and saving a lot of labor cost. At the same time, the system can avoid the hidden dangers caused by human feelings, sense of responsibility and inertia brought by manual prevention, and, ensure the consistent, accurate and reliable standards of detection work.

Further, the industrial control host is provided with a standard violation score. The misjudgment can be reduced by setting the standard violation score, effectively avoiding the violation caused by negligence or other reasons of the detected person, thus realizing no manual attendance, solving the problems of personnel recruitment, shift attendance and personnel management, and saving a lot of labor cost. At the same time, the system can avoid the hidden dangers caused by human feelings, sense of responsibility and inertia brought by manual prevention, and ensure the consistent accurate and reliable standards of detection work.

Further, the subjective intention degree of the monitored person can be effectively controlled through the position image of contraband goods. The misjudgment can be reduced by controlling the subjective intention degree of the monitored person, effectively avoiding the violation caused by negligence or other reasons of the detected person, thus realizing no manual attendance, solving the problems of personnel recruitment, shill attendance and personnel management, and saving a lot of labor cost. At the same time, the system can avoid the hidden dangers caused by human feelings, sense of responsibility and inertia brought by manual prevention, and ensure the consistent, accurate and reliable standards of detection work.

Further, the industrial control host can correct the standard violation times. Human-based management can be realized through the detected authority, effectively avoiding the violation caused by negligence or other reasons of the detected person, thus realizing no mammal attendance, solving the problems of personnel recruitment, shift attendance and personnel management, and saving a lot of labor cost. At the same time, the system can avoid the hidden dangers caused by human feelings, sense of responsibility and inertia brought by manual prevention, and ensure the consistent, accurate and reliable standards of detection work.

Compared with the prior art, the system according to the present disclosure has the following beneficial effect. The system according to the present disclosure can be accurately detect contraband goods, can more accurately judge violations by scoring violations, and can make the system more intelligent by accurately judging violations, thus realizing no manual attendance, solving the problems of personnel recruitment, shift attendance and personnel management, and saving a lot of labor cost. At the same time, the system can avoid the hidden dangers caused by human feelings, sense of responsibility and inertia brought by manual prevention, and ensure the consistent, accurate and reliable standards of detection work.

Reference numbers: 1—detection device for an electronic device, 2—traffic control device, 3—industrial control host, 4—outer door, 5—inner door, 6—access controller, 7—access data server, 8—traffic information server, 9—management terminal, 11—passage state indication device, 12—external identity verification device, 13—electronic detection control system, 14—location indication device for an electronic device, 15—LED indicator light, 21—anti-dismantling system, 22—voice player, 23—biometric device, 24—traffic control system, 25—anti-trailing system, 26—Lighting device, 27—video monitoring device, 28—cooling fan, 121—IC card reader, 122—first fingerprint identifier, 123—first palm and palm vein identifier, 124—first iris and face identifier, 231—second fingerprint identifier, 232—second palm and palm vein identifier, 233—second iris and face identifier.

DETAILED DESCRIPTION OF THE EMBODIMENTS

In order to make the objects and advantages of the present disclosure clearer, the present disclosure will be further described hereinafter with reference to embodiments. It should be understood that the specific embodiments described here are only for explaining the present disclosure, rather than limit the present disclosure.

The preferred embodiments of the present disclosure are described hereinafter with reference to the accompanying drawings. It should be understood by those skilled in the art that these embodiments are only used to explain the technical principle of the presort disclosure, rather than limit the scope of protection of the present disclosure.

It should be noted that in the description of the present disclosure, the orientation or position relationship indicated by the terms "upper", "lower", "left", "right", "inside", "outside" and the like is based on the orientation or position relationship shown in the attached drawings, which is only for the convenience of description, rather than indicate or imply that the devices or elements must have a specific orientation, be constructed and operated in a specific orientation. Therefore, it should not be understood as a limitation of the present disclosure.

In addition, it should also be noted that in the description of the present disclosure, unless otherwise specified and limited, the terms "installed", "linked" and "connected" should be understood broadly. For example, they can be fixedly connected, detachably connected or integrally connected; they can be mechanically connected or electrically connected; they can be directly connected or indirectly connected through an intermediate medium, or they ran be the internal communication of two elements. For those skilled in the art, the specific meanings of the above terms in the present disclosure can be understood according to specific situations.

Figure 1:
FIG. 1 is a structural, diagram of an intelligent prevention passage control system for an electronic device according to the present disclosure.
Figure 2:
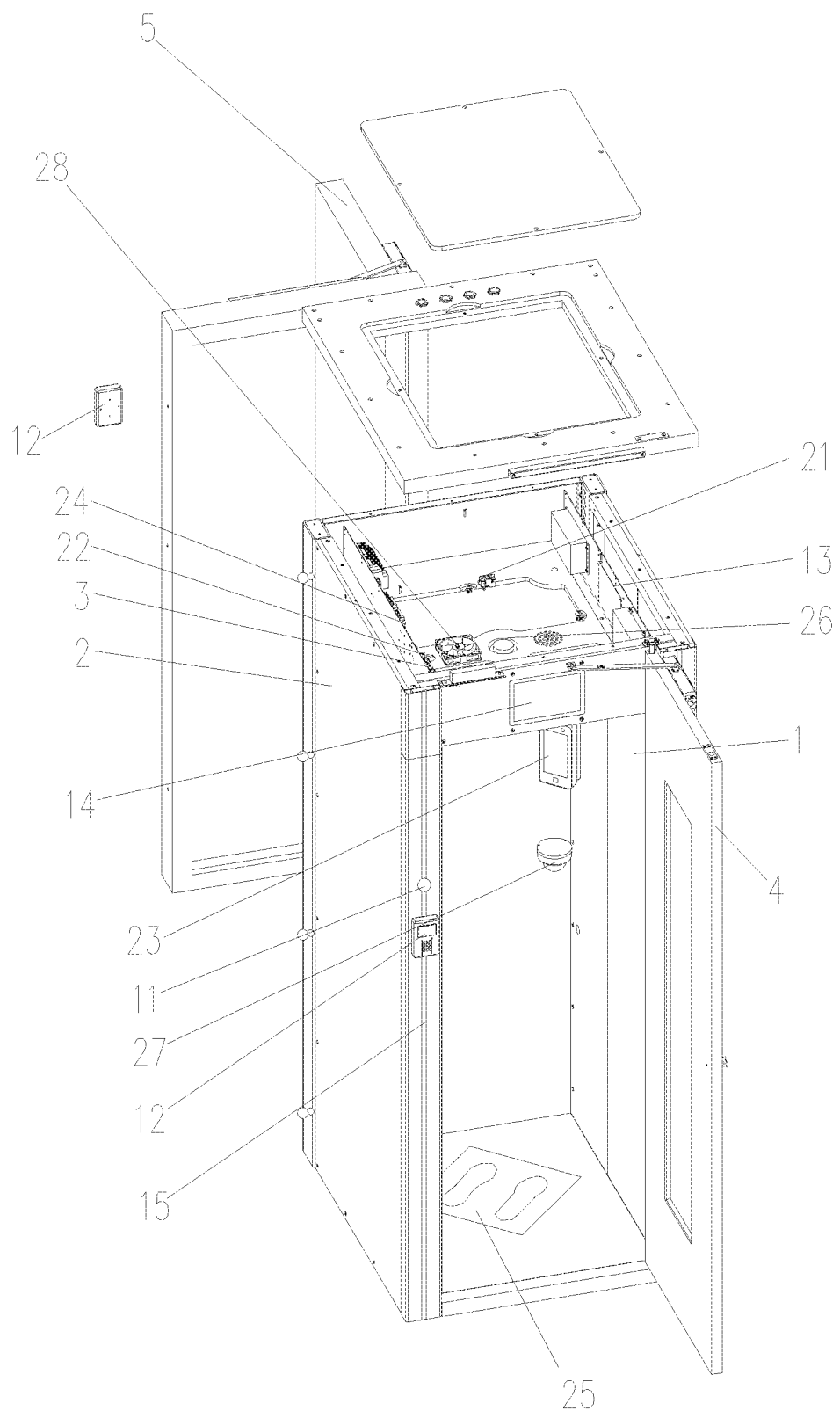
FIG. 2 is an exploded diagram of an intelligent prevention passage control system for an electronic device according to the present disclosure.
Figure 3:
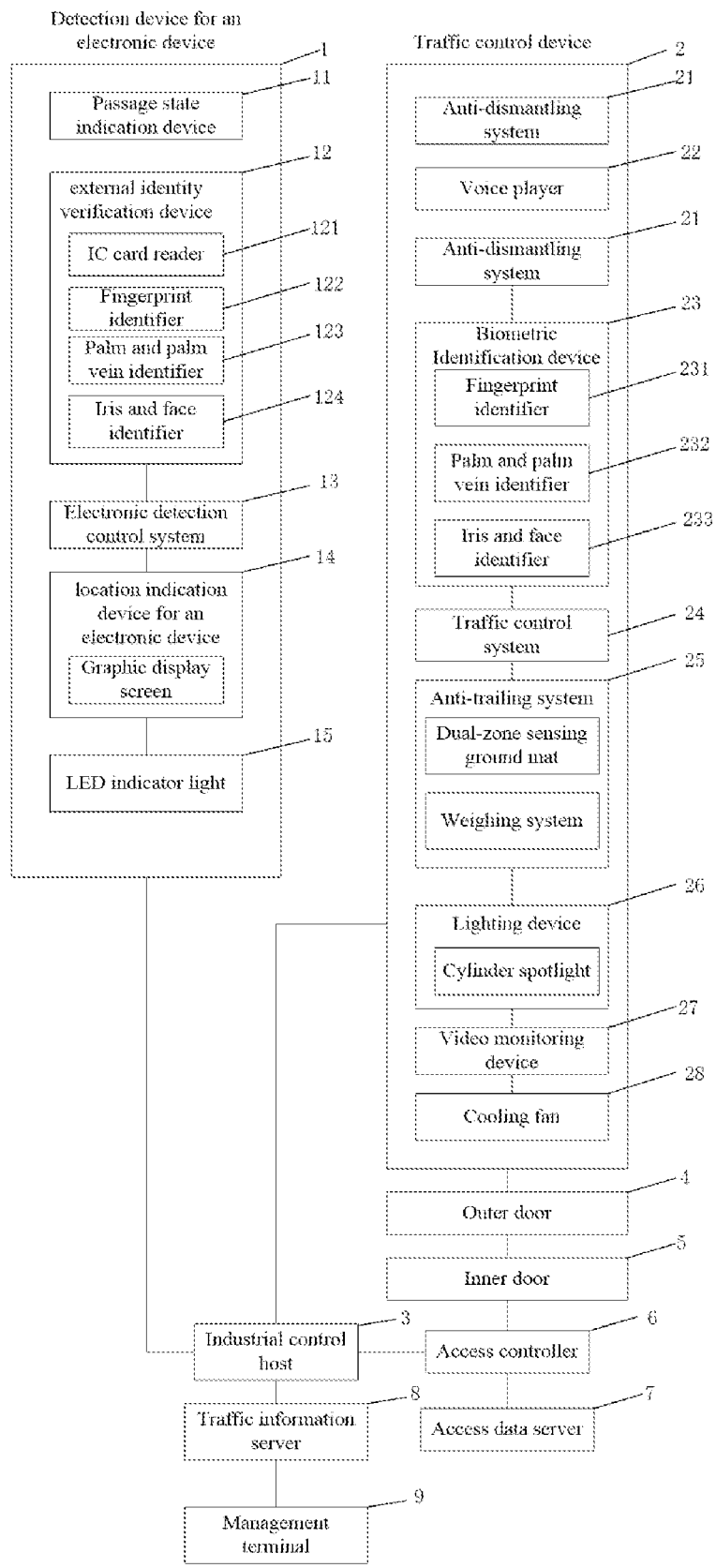
FIG. 3 is a structural block diagram of an intelligent prevention passage control system for an electronic device according to the present disclosure.

As shown in FIGS. 1-3, an intelligent prevention passage control system for an electronic device provided by the embodiment of the present disclosure comprises a detection device for an electronic device 1, a traffic control device and an industrial control host 3 built therein.

The passage state indication device 11 is installed above the identity verification device 12 on the left side wall of the entrance of the traffic control device 2, is electrically connected with the traffic control system 24, and is configured to indicate different, stages and abnormal situations in the identification process and give visual warning signals.

The external identity verification device 12, which is provided on the left side wall of the entrance of the traffic control device 2, includes but is not limited to IC card reader 121, a first fingerprint identifier 122, a first palm and palm vein identifier 123, a first iris and face identifier 124 and other devices for reading access cards or personal biometric information, and judges the identity of the person to be checked.

The electronic detection control system 13 is installed in the top space of the traffic control device 2, utilizes the principles of eddy current detection and electromagnetic induction, integrates the weak signal detection technology the precision filtering technology and the digital signal processing technology, and is configured to identify the electromagnetic identity characteristics of metal objects and judge whether the detected person carries contraband goods. The electronic detection control system can effectively eliminate the interference of daily carry-on objects such as watches, belt buckles, keys, cigarettes, lighters, etc., accurately distinguish whether to carry mobile phones, mobile hard disks, notebook computers, digital cameras, video cameras, etc. in any state such as standby, shutdown, startup, removing batteries, removing SIM cards, etc., and send the identification result to the industrial control host 3 through a serial interface.

The location indication device for an electronic device 14 using a high-resolution LCD color liquid crystal display screen, visually indicates the body part of the detected person where contraband goods is located through the plane graphic structure of the human body, and sends out instantaneous color light warning information.

The LED indicators 15, which are provided on the fixed vertical frames on both sides of the outer door 4, indicate the height, position of an electronic device as contraband goods in 10 sections from high to low.

The anti-dismantling system 21, which is located at the top of the traffic control device 2, is configured to detect the opening of a protective panel in the installation area of the control module at the top.

The voice player 22, which is provided at the top of the traffic control device 2, can be configured with Chinese and English voice players to play the system voice prompt information in real time.

The outer door 4, which is located at the front end of the traffic control device 2, is the first door of the two-door interlocking system in the control area, is located at the periphery of the secret-involved control area, and is referred to as the outer door.

The biometric identification device 23, which is located inside the traffic control device 2, comprises a second fingerprint identification device 231, a second palm and palm vein identification device 232, a second iris and face identification device 233, etc., to verify the identity of the person entering for the second time.

The inner door 5, which is located at the end of the traffic control device 2, is connected to the secret-involved control area and is referred to as the inner door.

The traffic control system 24, which is located in the top space of the traffic control device 2, acquires various digital and analog signals of the traffic control device 2, receives various control Instructions from the industrial control host 3, and drives the outer door 4 and the inner door 5.

The anti-trailing system 25, which is bonded to the inner bottom surface of the traffic control device 2, uses, but is not limited to, a dual-zone optical fiber sensing pad or a human body weighing system, thus preventing multiple people from entering at the same time, and realizing the purpose of authorizing only one person to pass at a time.

The light-sensing lighting device 25, which is provided at the top of the traffic control device 2, uses a microcomputer to control the light-sensing and pyroelectric infrared sensors to automatically sense the light intensity and the moving direction of the human body. The light is stronger than the brightness value set by the user, and the switch remains closed. When the light is weaker than this value, the switch can be fumed on automatically when people move in the sensing range, and the power saving ability is stronger and more accurate.

The lighting device 26 is provided at the lop of the traffic control device 2 for internal lighting.

The video monitoring device 27, which is provided at the top of the traffic control device 2 can be externally connected to the central monitoring system, and can dynamically monitors and covers the whole device.

The cooling fan 28, which is provided at the top of the traffic control device is configured to regulate the temperature of the control system at the top.

The industrial control host 3, which is built in the traffic control device 2, uses a high-performance industrial computer, and is connected with the external identity verification device 12, the electronic device detection system and the access controller through a serial port, with the passage state indication device 11 through a GPIO interlace, with the location indication device for the electronic device 14 through a CRT interface, and, with the information of the prohibited person through a TCP/IP interface.

The traffic information server 8 and the industrial control host 3 have built-in core management programs of the whole set of devices, which can count the number of times that the contraband goods carried by a single detected person has been detected in a specific time. When the number of times exceeds the set value of the system, the detected person will be automatically blacklisted, and the information will be synchronized to the information server of the prohibited person in real time. The information server of the prohibited person will in turn synchronize the information to other intelligent management and control system devices for gateway contraband goods in the control area (if there is only a one-passage, device in the control area, there is no need to add an information server of the prohibited person). To remove the blacklist, it is necessary to operate through the management terminal according to the management process.

The industrial control host presets the number of times $F0$ of carrying standard contraband goods and the area $V0$ of standard contraband goods, the industrial control host compares the number of times $F$ of carrying the actual contraband goods detected by the detection device for the electronic device with the standard violation times $F0$. If $F \geq F0$, the industrial control host judges that the number of times of the contraband goods carried by the detected person exceeds the standard and the detected person is blacklisted. If $F<F0$, the industrial control host judges that the number of times of the contraband goods carried by the detected person does not exceed the standard and the next detection is carried out. When detecting, contraband goods, the industrial control host compares the area $V$ of the actual contraband goods with the area $V0$ of the standard contraband goods, and adjusts the number of times of the actual contraband goods according to the comparison result.

Specifically, the electronic device detection system uses a brand-new probe layout structure, which can detect the human body from all directions and multiple angles and can locate the position of an electronic device. The system uses an intelligent algorithm to predict suspicious objects, so as to intelligently distinguish and identify the types of suspicious electronic devices. The system has strong anti-environmental interference ability and can be applied to any environment.

The present disclosure has a special prevention and management function, and can count the number of times that people detect electronic devices according to the time set by the system (several months or weeks), so as to give an early warning to people, who illegally carry an electronic device for many times, and prompt the secrecy department to make corresponding management measures such as background check and admonishing conversation.

The present disclosure realizes no manual attendance, solves the problems of personnel recruitment, shift attendance and personnel management, and saves a lot of labor cost. At the same time, the system can avoid the hidden dangers caused by human feelings, sense of responsibility and inertia brought by manual prevention, and ensure the consistent, accurate and reliable standards of detection work.

Specifically, the industrial control host also presets the standard authority level $B0$ of the detected person, and when the contraband goods is detected, the industrial control host corrects the violation score according to the actual authority level $B$ of the detected person;

when $B<B0$, the industrial control host corrects the violation score $B$ and denotes the corrected standard violation times as $Ea$, and $Ea=E \times (B-B0/B+B0)$ is set;

when $B=B0$, the industrial control host does not correct the violation score $E$;

when $B>B0$, the industrial control host corrects the violation score $B$ and denotes the corrected standard violation times as $Eb$, and $Eb=E \times (1 \times (B-B0/B \times B0))$ is set.

Specifically, when the industrial control host judges that the detected person carries contraband goods, the industrial control host calculates the area $V$ of the actual contraband goods according to the human body plan information generated by the electronic device detection system, and after the calculation, the industrial control host compares the area $V$ of the actual contraband goods with the area $V0$ of the standard contraband goods and makes secondary correction to the violation score according to the comparison result;

when $V \geq V0$, the industrial control host judges that the detected person accidentally carries contraband goods and does not correct the actual violation times;

when $V<V0$, the industrial control host judges that the detected person intentionally carries contraband goods and makes secondary correction to the violation score.

Specifically, when the industrial control host makes secondary correction to the violation score, the industrial control host calculates the secondary violation score correction adjustment coefficient $\alpha$, and $\alpha=V0/V$ is set;

when $B<B0$, the industrial control host denotes the violation score after secondary correction as $Ea'$, and $Ea'=Ea \times \alpha$ is set;

when $B=B0$, the industrial control host denotes the violation score after secondary correction as and $E'$, and $E'=E \times \alpha$ is set;

when $B>B0$, the industrial control host denotes the violation score after secondary correction as $Eb'$, and $Eb'=Eb \times \alpha$ is set.

Specifically, when contraband goods is detected, the industrial control host compares the violation score $E$ with the standard violation score $E0$;

when $E \geq E0$, the industrial control host denotes the violation as the number of times of carrying contraband goods:

when $E<E0$, the industrial control host does not denote the violation as the number of times of carrying contraband goods.

Specifically, when scoring violations, the industrial control host judges whether the detected person intentionally carries contraband goods according to the position image of the actual contraband goods, if the contraband goods is concealed, the industrial control host denotes the violation as the number of times of carrying contraband goods, and if the contraband is not concealed, the industrial control host scores the violation.

Specifically, when contraband goods is detected, the industrial control host corrects the standard violation times F0 according to the actual authority level B of the detected person;

when B≤B0, the industrial control host does not correct the standard violation times F0;

when B>B0, the industrial control host corrects the standard violation times. F0 and denotes the corrected standard violation times as F0', and F0'=F×(B−B0/B+B0) is set, wherein when F0' is not an integer, it is rounded down.

Specifically, the industrial control host presets a first contraband goods category A1 a second contraband goods category A2, a third contraband goods category A3 and a fourth contraband goods category A4, the industrial control host selects the corresponding violation score E according to the contraband goods category, and when the industrial control host sets the contraband goods category as Ai, i=1,2,3,4, and the industrial control host denotes the violation score as Ei.

Specifically, the specific working mode of the present disclosure is as follows: people identification→people entering tire detection device for an electronic device→people passing the inspection entering the traffic control device-→biometric identification→people passing the biometric identification→completing detection. After a person enters the detection device for an electronic device, the qualified person will leave qualified record information corresponding to the card number of the person. If it is found that the electronic device will give an alarm and a voice prompt to quit, record information of detecting the category of the electronic devices will be left corresponding to the card number of the person.

The present disclosure realizes no manual attendance, solves the problems of personnel recruitment, shill attendance and personnel management, and saves a lot of labor cost. At the same time, the system can avoid the hidden dangers caused by human feelings, sense of responsibility and inertia brought by manual prevention, and ensure the consistent, accurate and reliable standards of detection work.

So far, the technical scheme of the present disclosure has been described with reference to the preferred embodiments shown in the drawings, but it is easy for those skilled in the art to understand that the scope of protection of the present disclosure is obviously not limited to these specific embodiments. Without departing from the principle of the present disclosure, those skilled in the art can make equivalent changes or substitutions to related technical features, and the technical solutions after these changes or substitutions will fall within the scope of protection of the present disclosure.

The above is only a preferred embodiment of the present disclosure, rather than limit the present disclosure. Various modifications and variations of the present disclosure are possible to those skilled in the art. Any modification, equivalent substitution, improvement, etc. made within the spirit and principle of the present disclosure shall be included in the scope of protection of the present disclosure.

The invention claimed is:

1. An intelligent prevention passage control system for an electronic device, comprising: a traffic control device, a detection device for an electronic device provided inside the traffic control device, an industrial control host, an access controller and a management terminal;

wherein the detection device for the electronic device comprises an external identity verification device installed on the right side wall of the detection device for the electronic device, a passage state indication device installed at the top of the detection device for the electronic device, an electronic device detection system and a sound warning device, and is configured to judge whether the detected person carries contraband goods;

the traffic control device is connected with the detection device Far the electronic device, and comprises a traffic control system installed at the top of the traffic control device, a light-sensing lighting device, a lighting device, a video monitoring device, a contraband goods indication device installed on the right vertical face of the middle part of an outer door of the traffic control device, an access control authorization state indication device, a biometric identification device installed inside the traffic control device, and an inner door and an outer door installed at both ends of the traffic control device, and is configured to judge whether to release the detected person;

the industrial control host is provided inside the traffic control device, is connected with the detection device for the electronic device the traffic control device, the server, the access controller and the management terminal, and is configured to control the operation of the system;

the industrial control host presets the number of times (Fo) of carrying standard contraband goods and the area (Vo) of standard contraband goods, the industrial control host compares the number of times (F) of carrying the actual contraband goods detected by the detection device for the electronic device with the standard violation times F0, if F≥F0, the industrial control host judges that the number of times of the contraband goods carried by the detected person exceeds the standard and the detected person is blacklisted, if F<F0, the industrial control host judges that the number of times of the contraband goods carried by the detected person does not exceed the standard and the next detection is carried out; when detecting contraband goods, the industrial control host compares the area (V) of the actual contraband goods with the area (Vo) of the standard contraband goods, and adjusts the number of times of the actual contraband goods according to the comparison result.

2. The intelligent prevention passage control system for an electronic device according to claim 1, wherein the industrial control host also presets the standard authority level B0 of the detected person, and when the contraband goods is detected, the industrial control host corrects the violation score according to the actual authority level B of the detected person;

when B>B0, the industrial control host corrects the violation score E and denotes the corrected standard violation times as Ea, and Ea×E×(B−B0/B+B0) is set;

when B=B0, the industrial control host does not correct the violation score E;

when B>B0, the industrial control host corrects the violation score E and denotes the corrected standard violation times as Eb, and Eb=E×(1÷(B−B0/B+B0)) is set.

3. The intelligent prevention passage control system for an electronic device according to claim 2, wherein when the industrial control host judges that the detected person carries contraband goods, the industrial control host calculates the area V of the actual contraband goods according to the human body plan information, generated by the electronic device detection system, and after the calculation, the industrial control host compares the area V of the actual contraband goods with the area V0 of the standard contraband goods and makes secondary correction to the violation score according to the comparison result;

when V≥V0, the industrial control host judges that the detected person accidentally carries contraband goods and does not correct the actual violation times;

when V<V0, the industrial control host judges that the detected person intentionally carries contraband goods and makes secondary correction to the violation score.

4. The intelligent prevention passage control system for an electronic device according to claim 3, wherein when the industrial control host makes secondary correction to the violation score, the industrial control host calculates the secondary violation score correction adjustment coefficient α, and α=V0/V is set;

when B<B0, the industrial control host denotes the violation score after secondary correction as Ea', and Ea'=Ea×α is set;

when B=B0, the industrial control host denotes the violation score after secondary correction as and E', and E'=E×α is set;

when B>B0, the industrial control host denotes the violation score after secondary correction as Eb', and Eb'=Eb×α is set.

5. The intelligent prevention passage control system for an electronic device according to claim 4, wherein when contraband goods is detected, the industrial control host compares the violation score E with the standard violation score E0;

when E≥E0, the industrial control host denotes the violation as the number of times of carrying contraband goods;

when E<E0, the industrial control host dyes not denote the violation as the number of times of carrying contraband goods.

6. The intelligent prevention passage control system for an electronic device according to claim 5, wherein when scoring violations, the industrial control host judges whether the detected person intentionally carries contraband goods according to the position image of the actual contraband goods, if the contraband goods is concealed, the industrial control host denotes the violation as the number of limes of carrying contraband goods, and if the contraband is not concealed, the industrial control host scores the violation.

7. The intelligent prevention passage control system for an electronic device according to claim 1, wherein when contraband goods is detected, the industrial control host corrects the standard violation times F0 according to the actual authority level B of the detected person;

when B≤B0, the industrial control host does not correct the standard violation times F0;

when B>B0, the industrial control host corrects the standard violation times F0 and denotes the corrected standard violation times as and F0', and F0'=F×(B−B0/B+B0) is set, wherein when F0' is not an integer, it is rounded down.

8. The intelligent prevention passage control system for an electronic device according to claim 1, wherein the industrial control host presets a first contraband goods category A1 a second contraband goods category A2, a third contraband goods category A3 and a fourth contraband goods category A4, the industrial control host selects the corresponding violation score E according to the contraband goods category, and when the industrial control host sets the contraband goods category as Ai, i=1, 2, 3, 4, and the industrial control host denotes the violation score as Ei.

* * * * *